United States Patent
Lundkvist et al.

(10) Patent No.: US 10,390,538 B2
(45) Date of Patent: Aug. 27, 2019

(54) PROCESS FOR PREPARING A BAKED PRODUCT WITH ANTI-STALING AMYLASE AND PEPTIDASE

(75) Inventors: Henrik Lundkvist, Malmo (SE); Merete Moller Engelsen, Frederiksberg (DK); Gitte Budolfsen Lynglev, Frederiksberg (DK); Peter Rahbek Ostergaard, Virum (DK)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 13/810,276

(22) PCT Filed: Jul. 19, 2011

(86) PCT No.: PCT/EP2011/062341
§ 371 (c)(1),
(2), (4) Date: Mar. 25, 2013

(87) PCT Pub. No.: WO2012/010592
PCT Pub. Date: Jan. 26, 2012

(65) Prior Publication Data
US 2014/0147553 A1 May 29, 2014

Related U.S. Application Data

(60) Provisional application No. 61/366,321, filed on Jul. 21, 2010.

(30) Foreign Application Priority Data

Jul. 21, 2010 (EP) .................................. 10170322
Oct. 13, 2010 (EP) .................................. 10187453

(51) Int. Cl.
*A21D 8/04* (2006.01)
(52) U.S. Cl.
CPC .................................. *A21D 8/042* (2013.01)
(58) Field of Classification Search
CPC .......... A21D 8/042; A21D 8/04; C12P 19/14; C11D 3/386; C11D 3/38618; C12N 9/2414; C12N 9/2411; C12N 9/242; C12Y 302/01001; C12Y 304/16; C12Y 304/17; C12Y 304/18; C12Y 304/19; C12Y 304/21; C12Y 304/22; C12Y 304/23; C12Y 304/24; C12Y 304/25; A23V 2002/00; A23J 3/34
USPC ............ 435/202, 252.31; 510/530; 424/94.2; 426/20, 549, 63
See application file for complete search history.

(56) References Cited

U.S. PATENT DOCUMENTS

| 4,961,937 | A  | * | 10/1990 | Rudel | A21D 2/265 426/19 |
| 6,413,559 | B1 |   | 7/2002  | Kauppinen et al. | |
| 6,830,770 | B1 | * | 12/2004 | Kilibwa | A21D 2/181 426/19 |
| 6,890,572 | B2 | * | 5/2005  | Kragh et al. | 426/28 |
| 6,929,936 | B1 | * | 8/2005  | Rouau | A21D 8/042 426/653 |
| 2004/0028773 | A1 |   | 2/2004  | Sturkenboom et al. | |
| 2005/0202144 | A1 | * | 9/2005  | Sturkenboom et al. | 426/549 |
| 2009/0304860 | A1 |   | 12/2009 | Burkardt et al. | |

FOREIGN PATENT DOCUMENTS

| EP | 0215594 | * | 3/1987 | C12N 15/00 |
| EP | 2047752 A1 |   | 4/2009 | |
| WO | WO9851163 | * | 11/1998 | A23J 3/34 |
| WO | 00/59307 A1 |   | 10/2000 | |
| WO | 02/19828 A1 |   | 3/2002 | |
| WO | WO2004029202 | * | 4/2004 | |
| WO | 2009/083592 A1 |   | 7/2009 | |

OTHER PUBLICATIONS

L'Anson, K.J.A. et al. Microbiology. 141: 2873-2881 (1995).*
Sequence search-SEQ ID No. 9 (Year: 1987).*

* cited by examiner

*Primary Examiner* — Hamid R Badr
(74) *Attorney, Agent, or Firm* — Kelly Reynolds

(57) ABSTRACT

The present invention provides processes for preparing dough which comprises at least one anti-staling amylase and at least one peptidase. In addition, the present invention provides baked products produced there from which have a desirable degree of softness and improved springiness.

6 Claims, No Drawings
Specification includes a Sequence Listing.

PROCESS FOR PREPARING A BAKED PRODUCT WITH ANTI-STALING AMYLASE AND PEPTIDASE

CROSS-REFERENCE TO RELATED APPLICATIONS

This application is a 35 U.S.C. 371 national application of PCT/EP2011/062341 filed Jul. 19, 2011 which claims priority or the benefit under 35 U.S.C. 119 of European application nos. 10170322.1 and 10187453.5 filed Jul. 21, 2010 and Oct. 13, 2010 and U.S. provisional application No. 61/366,321 filed Jul. 21, 2010, the contents of which are fully incorporated herein by reference.

REFERENCE TO A SEQUENCE LISTING

This application contains a Sequence Listing in computer readable form, which is incorporated herein by reference.

FIELD OF THE INVENTION

The present invention relates to processes for preparing dough which includes at least one anti-staling amylase and at least one peptidase. In addition, the present invention provides baked products produced there from which have a desirable degree of softness and improved springiness.

BACKGROUND OF THE INVENTION

It is well known that bread loses many of its fresh baked qualities over time. The term staling is used to describe such undesirable changes in the properties of bread over time which can include, for example, loss of softness (or an increase in the firmness of the crumb), a decrease in the elasticity of the crumb (loss of springiness), and changes in the crust texture which can become tough and leathery. Addressing certain of these undesirable changes may exacerbate other undesirable changes. For example, although addition of an anti-staling amylase to the dough retards crumb firming of the resultant baked product over time, the dose of amylase that may be employed to produce an acceptable crumb is limited. In particular, an excessive dose of anti-staling amylase produces deleterious effects on the resultant baked product including an unacceptably sticky or gummy crumb. Thus, the balance of specific components to achieve the desired end product is delicate, complex and highly unpredictable.

As consumers associate the softness and springiness of bread with freshness, there is a need for baked products with a crumb having a desirable degree of softness as well as improved springiness.

SUMMARY OF THE INVENTION

The freshness of a baked product is often judged by consumers who apply pressure to the crumb to test for softness. Unless the baked product has sufficient resilience to spring back to its approximate original shape following such testing, the baked product may remain deformed, rendering it aesthetically unappealing and suggestive of bread which is not fresh. In one aspect, the present invention provides baked products that maintain properties associated with freshness including a desirable degree of softness, as well as springiness, for at least 14 days and even 21 days or more after baking.

In one aspect, the present invention provides processes for producing dough that incorporate a peptidase, whereby the baked product produced there from has and maintains a desirable degree of springiness. Additionally, the incorporation of peptidase in dough permits an amount of anti-staling amylase to be used in the dough such that the resultant baked product produced there from has and maintains desirable crumb qualities including a desirable degree of softness and springiness for at least 14 days and even 21 days or more after baking. It has been discovered that, the incorporation of peptidase in combination with an anti-staling amylase in the dough allows for a higher amount of anti-staling amylase to be employed, while still producing a baked product that has desirable crumb qualities including a favorable degree of moistness. Furthermore, the incorporation of peptidase in dough provides a baked product that has an increase in free water mobility and/or a decrease in the rate of moisture loss over time which provides a baked product with a desirable moistness perception.

In one aspect, the present invention provides processes for producing dough, which processes include an anti-staling amylase in combination with a peptidase, whereby the baked product produced there from has and maintains a desirable degree of softness and improved springiness, as compared to bread made without such combination.

In another aspect, the present invention provides bread with excellent crumb quality over a period of at least 3 weeks shelf-life (or storage) following baking, as compared to current baked-to-inventory bread, which has a shelf-life of approximately 3-12 days. Excellent crumb quality means the crumb retains such fresh-baked qualities as softness, springiness and elasticity over its shelf-life. These qualities during shelf-life remain similar to those of fresh bread, thereby enhancing the desirability to a consumer.

In yet another aspect of the invention, there is provided a premix of an anti-staling amylase and a peptidase, said premix being useful as an additive to dough to produce a baked product, such as bread with a shelf-life of at least three weeks.

In another aspect of the invention, there is provided a method of increasing the ability to add greater amount of anti-staling amylase to a dough or baked product without experiencing deleterious effects commonly associated with such greater amounts, e.g., unacceptable moistness in the bread crumb. The method includes adding a combination of the anti-staling amylase and a peptidase.

In another aspect of the invention, bread prepared from dough with the combination of peptidase and anti-staling amylase has a desirable level of firmness that is comparable or less than that of bread prepared from dough with anti-staling amylase but no peptidase following storage for 4 to 21 days after baking.

In still another aspect of the invention, there is provided a process and bread product prepared from dough with the combination of peptidase and anti-staling amylase, which results in a desirable level of springiness in the final baked product that is greater than that of bread prepared from dough with amylase but no peptidase following storage for 4 to 21 days after baking.

In another aspect, the invention provides processes for preparing a baked product which includes: (i) adding to either a flour that is used to form a dough or directly to a dough: (a) at least one anti-staling amylase in an amount sufficient to decrease firmness of the baked product; and (b) at least one peptidase in an amount sufficient to increase springiness of the baked product.

In another aspect, the invention provides baked products produced by a process comprising: (i) adding to either a flour that is used to form a dough or directly to a dough: (a) at least one peptidase in an amount sufficient to increase the springiness of the baked product and (b) at least one anti-staling amylase in an amount sufficient to decrease the firmness of the baked product; and (ii) baking the dough to form the baked product.

In one aspect, the invention provides compositions for preparing dough for baking comprising: (i) at least one peptidase; (ii) at least one anti-staling amylase; (iii) optionally, at least one or more other enzymes; and (iv) optionally, flour.

DETAILED DESCRIPTION OF THE INVENTION

As used herein the following terms shall have the definitions set forth below.

As used herein the term "firmness" with regard to the crumb of a baked product refers to the amount of weight that compresses the crumb by 20% as detailed in the Texture Analyzer method described below.

As used herein the term "springiness" with regard to the crumb of a baked product refers to the resiliency of the crumb to pressure applied thereto. The springiness of a baked product may be quantitated using the Texture Analyzer method described below. In preferred embodiments of the invention the springiness is maintained for a storage period of at least 4-14 days, 4-21 days, and/or 14-21 days after baking. By the term "maintained springiness" is understood that the relative springiness is reduced by no more than 10%, no more than 7.5%, no more than 5%, or even no more than 2.5% during the storage period. Most preferably the relative springiness is substantially constant or even slightly increased during the storage period.

As used herein the term "staling" describes undesirable changes in the properties of bread over time, including an increase in the firmness of the crumb, a decrease in the elasticity of the crumb, and/or changes in the crust which becomes tough and leathery. Quantitatively, staling also refers to a decrease in the amount of free water present in a baked product over time. As the moist feeling of bread crumb is related to the amount of free water present, it is desirable for bread to retain a sufficient amount of free water to maintain the moist feeling associated with freshness.

The terms "shelf-life" or "storage" are used interchangeably and mean a period of time after baking, including the time while the baked product is warehoused, shipped, on-the-shelf at a point-of-purchase until consumption. "Shelf-life" further connotes the time during which the bread retains enough of its fresh-baked properties to still be considered "fresh", as discussed herein. For purposes of the present invention, the shelf-life will include at least a period (storage period) from 4 to about 21 days, and more preferably a period of about 14 to 21 days. While conditions of temperature and moisture may vary during storage, preferably the temperature is about −25° C. to about 30° C., more preferably the temperature is about 5° C. to about 25° C. and the relative humidity is about 20% to about 100%. Baked products using the inventive compositions and processes may even retain their freshness over time even under conditions outside of these ranges.

Peptidases

As used herein the term "peptidase" refers to a proteolytic enzyme that hydrolyses a peptide bond. There are two types of peptidases, exopeptidases and endopeptidases. An "exopeptidase" or an "exoproteinase" is an exo-acting peptidase that hydrolyses peptide bonds from the N-terminus or C-terminus of a peptide and may be further classified by the number of amino acids cleaved off from the peptide. An "endopeptidase" or an "endoproteinase" is an endo-acting peptidase that is able to hydrolyse any peptide bond in a peptide. However, as endopeptidases often have catalytic sites involving binding to several amino acids (often on both sides of the cleavage point) endopeptidases in general have preference for non-terminal peptide bonds. Peptidases may be classified based on the reaction they catalyze (i.e., functionally as exemplified by the Nomenclature Committee of IUBMB) or based on 3-D structure, homology and similar characteristics (as exemplified by MEROPS classification).

Exemplary exopeptidases for use in the present invention include ExoP1 (Uniprot:q2ulm2) from *Aspergillus oryzae* (SEQ ID NO:1) (MEROPS class: MH-M28A), ExoP2 (Uniprot:q2tz11) from *Aspergillus oryzae* (SEQ ID NO:2) (MEROPS class: SC-S10), ExoP3 (Uniprot:Q48677) from *Lactococcus lactis cremori* (SEQ ID NO:3) (MEROPS class: MH-M42), ExoP4 (Uniprot:q65dh7) from *Bacillus licheniformis* (SEQ ID NO:4) (MEROPS class: MH-M28), ExoP5 (Uniprot:q2tya1) from *Aspergillus oryzae* (SEQ ID NO:5) (MEROPS class: SC-S10), ExoP6 (Uniprot:q2uh35) from *Aspergillus oryzae* (SEQ ID NO:6) (MEROPS class: SC-S9B), and ExoP7 from *Aspergillus oryzae* (SEQ ID NO:7) (MEROPS class: AA-A1).

Exemplary endopeptidases include EndoP1 (Uniprot:p06832) from *Bacillus amyloliquefaciens* (SEQ ID NO:11) (MEROPS class: MH-M4), EndoP2 from *Aspergillus oryzae* (SEQ ID NO:12) (MEROPS class: PA-S1A), EndoP3 (Uniprot:p35049) from *Fusarium oxysporium* (SEQ ID NO:8) (MEROPS class: PA-S1A), EndoP4 (Uniprot:p00799) from *Rhizomucor miehei* (SEQ ID NO:9) (MEROPS class: AA-A1), EndoP5 from *Alicyclobacillus* sp. (SEQ ID NO:15) (MEROPS class: GA-G1), EndoP6 from *Thermoascus aurantiacus* (SEQ ID NO:14) (MEROPS class: MH-M35), EndoP7 from *Aspergillus oryzae* (SEQ ID NO:12) (MEROPS class: MH-M36), and EndoP8 (Uniprot:p00761) from *Sus scrofa* (pig) (SEQ ID NO:10) (MEROPS class: PA-S1A).

Combinations of these peptidases may also be used. Also preferred for the invention is a peptidase being at least 50%, at least 60%, at least 70%, at least 80%, at least 90%, at least 95%, or even at least 99% identical to any of SEQ ID NOS: 1 to 12.

In one embodiment, at least one peptidase is chosen from EndoP2, ExoP4, ExoP5, or EndoP3. Combinations of the peptidases may also be used.

The peptidase may have optimum activity at pH 3-10. However, it is sufficient that the peptidase have some activity under the conditions of temperature and pH in which the dough is exposed during processing.

The peptidase may be derived from fungal sources, e.g., an *Acremonium, Aspergillus, Aureobasidium, Bjerkandera, Ceriporiopsis, Chrysosporium, Coprinus, Coriolus, Cryptococcus, Filibasidium, Fusarium, Humicola, Magnaporthe, Mucor, Myceliophthora, Neocallimastix, Neurospora, Paecilomyces, Penicillium, Phanerochaete, Phlebia, Piromyces, Pleurotus, Schizophyllum, Talaromyces, Thermoascus, Thielavia, Tolypocladium, Trametes*, or *Trichoderma* cell.

For example, the sources may be an *Aspergillus awamori, Aspergillus foetidus, Aspergillus fumigatus, Aspergillus japonicus, Aspergillus nidulans, Aspergillus niger, Aspergillus oryzae, Bjerkandera adusta, Ceriporiopsis aneirina, Ceriporiopsis caregiea, Ceriporiopsis gilvescens, Ceripori-* opsis pannocinta, Ceriporiopsis rivulosa, Ceriporiopsis subrufa, Ceriporiopsis subvermispora, Chrysosporium inops, Chrysosporium keratinophilum, Chrysosporium lucknowense, Chrysosporium merdarium, Chrysosporium pannicola, Chrysosporium queenslandicum, Chrysosporium tropicum, Chrysosporium zonaturn, Coprinus cinereus, Coriolus hirsutus, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola insolens, Humicola lanuginosa, Mucor miehei, Myceliophthora thermophila, Neurospora crassa, Penicillium purpurogenum, Phanerochaete chrysosporium, Phlebia radiata, Pleurotus eryngii, Thermoascus aurantiacus, Thielavia terrestris, Trametes villosa, Trametes versicolor, Trichoderma harzianum, Trichoderma koningii, Trichoderma longibrachiatum, Trichoderma reesei, or Trichoderma viride cell.

The peptidase may be derived from a bacterial source, e.g., examples of bacterial sources of enzymes include a gram-positive bacterial such as an Alicyclobacillus. Bacillus, Clostridium, Enterococcus, Geobacillus, Lactobacillus, Lactococcus, Nocardiopsis, Oceanobacillus, Staphylococcus, Streptococcus, or Streptomyces and gram-negative bacterial polypeptide such as a Campylobacter, E. coli, Flavobacterium, Fusobacterium, Helicobacter, Ilyobacter, Neisseria, Pseudomonas, Salmonella, or Ureaplasma maltogenic alpha-amylase. Particular bacterial sources of enzymes include Bacillus alkalophilus, Bacillus amyloliquefaciens, Bacillus brevis, Bacillus circulans, Bacillus clausii, Bacillus coagulans, Bacillus firmus, Bacillus lautus, Bacillus lentus, Bacillus licheniformis, Bacillus megaterium, Bacillus pumilus, Bacillus subtilis, Bacillus thuringiensis, Nocardiopsis prasina, Streptococcus equisimilis, Streptococcus pyogenes, Streptococcus uberis, or Streptococcus equi subsp. Zooepidemicus, Streptomycin achromogenes, Streptomyces avermitilis, Streptomyces coelicolor, and Streptomyces griseus.

The peptidase may be derived from a mammal sources, e.g., such as from a pig (Sus scofa).

The peptidase may be added in an amount such that one or more of the following properties is observed in the baked product produced there from: (i) the degree of springiness as measured using the Texture Analyzer method described herein is at least 0.5%, at least 1%, at least 2%, or even at least 3% greater compared to a control baked product prepared from dough of the same composition but in the absence of the combination of anti-staling amylase and peptidase following storage for at least 21 days after baking; (ii) the rate of free water loss as measured using the NMR method described herein is reduced relative to a control baked product prepared from dough of the same composition but in the absence of the combination of anti-staling amylase and peptidase following storage for at least 21 days after baking; (iii) the percentage of free water mobility as measured using the NMR method described herein is at least 0.5%, at least 1%, at least 2% or even at least 3% less compared to a control baked product prepared from dough of the same composition but in the absence of the combination of anti-staling amylase and peptidase following storage for at least 21 days after baking.

In one embodiment, the amount of peptidase added may be at least about 0.01 mg peptidase per kg flour in total added to the dough. In one embodiment, the amount of endopeptidase added may be about 0.01 mg/kg to about 35 mg/kg flour in total added to the dough. In another embodiment, the amount of exopeptidase added may be about 0.1 mg/kg to about 10 mg/kg flour in total added to the dough.

Anti-Staling Amylases

Useful anti-staling amylases may be of the fungal or bacterial type, e.g., a maltogenic alpha-amylase from B. stearothermophilus or an alpha-amylase from Bacillus, e.g. B. lichenifomis or B. amyloliquefaciens, a beta-amylase, e.g., from plant (e.g., soy bean) or from microbial sources (e.g., Bacillus), a glucoamylase, e.g., from A. niger, or a fungal alpha-amylase, e.g., from A. oryzae. Suitable exoamylases are described in U.S. Pat. No. RE38,507, incorporated herein by reference in its entirety.

For example, suitable, non-limiting examples of anti-staling amylases include microbial exoamylases as these are easier to produce on a large scale than exoamylases of, for instance, plant origin.

An example of a suitable exoamylase is a maltogenic amylase producible by Bacillus strain NCIB 11837, or one encoded by a DNA sequence derived from Bacillus strain NCIB 11837 (the maltogenic amylase is disclosed in U.S. Pat. No. 4,598,048 and U.S. Pat. No. 4,604,355, the contents of which are incorporated herein by reference). This maltogenic amylase is capable of hydrolyzing 1,4-alpha-glucosidic linkages in starch, partially hydrolyzed starch and oligosaccharides (e.g. maltotriose). Maltose units are removed from the non-reducing chain ends in a stepwise manner. The maltose released is in the alpha-configuration. In the U.S. patents mentioned above, the maltogenic amylase is indicated to be useful for the production of maltose syrup of a high purity.

Another maltogenic amylase which may be used in the present process is a maltogenic-beta-amylase producible by Bacillus strain NCIB 11608 (disclosed in EP 234 858, the contents of which are hereby incorporated by reference).

The anti-staling amylase may be added in a sufficient amount such that the baked product produced there from has a degree of firmness, as measured using the Texture Analyzer method described herein, that is comparable or less than that compared to a control baked product prepared from dough without the added combination of anti-staling amylase and peptidase, and this degree of firmness lasts for at least 4 to 21 days after baking, and preferably 14 to 21 days after baking.

In one embodiment, the anti-staling amylase may be added in an amount of 0.1-10,000 MANU, preferably 1-5000 MANU, more preferably 5-2000 MANU, and most preferably 10-1000 MANU, per kg of flour. One MANU (Maltogenic Amylase Novo Unit) may be defined as the amount of enzyme required to release one micromol of maltose per minute at a concentration of 10 mg of maltotriose (Sigma M 8378) substrate per ml of 0.1 M citrate buffer, pH 5.0 at 37° C. for 30 minutes.

In one embodiment, the anti-staling amylase is a recombinant maltogenic amylase encoded by a DNA sequence derived from Bacillus strain NCIB 11837, described in U.S. Pat. No. 4,598,048 commercially known as Novamyl™ (available from Novozymes A/S). Typically, Novamyl™ is added in an amount that is at least 100 ppm/kg. In one embodiment, Novamyl™ is added in an amount that is up to 5000 MANU/kg. In one embodiment, Novamyl™ is added in an amount that is in a range of at least 100 MANU/kg flour to about 3000 MANU/kg flour.

In one embodiment, the anti-staling amylase is the enzyme commercially known as Opticake™ (available from Novozymes). Typically, Opticake™ is added in an amount that is at least 333 MANU/kg. In one embodiment, Opticake™ is added in an amount that is up to 666 MANU/kg. In one embodiment, Opticake™ is added in an amount that is at least 333 MANU/kg but less than 666 MANU/kg.

In one embodiment, the anti-staling amylase is a G4 amylase. A non-limiting example of a G4 amylase includes GRINDAMYL™ POWERFresh (available from Danisco A/S).

Dough

Dough generally comprises flour or meal such as wheat flour, wheat meal, corn flour, corn starch, rye meal, rye flour, oat flour, oat meal, soy flour, sorghum meal, sorghum flour, potato meal, potato flour or potato starch. Preferred for the present invention is wheat flour, and more preferably whole wheat flour. The word "whole" refers to the fact that all of the grain (bran, germ, and endosperm) is used in making the flour.

The dough is normally a leavened dough or a dough to be subjected to leavening. The dough may be leavened in various ways, such as by adding chemical leavening agents, e.g., sodium bicarbonate or by adding a leaven (fermenting dough), but it is preferred to leaven the dough by adding a suitable yeast culture, such as a culture of *Saccharomyces cerevisiae* (baker's yeast), e.g. a commercially available strain of *S. cerevisiae*.

The dough may also comprise other conventional dough ingredients, e.g.; proteins, such as milk powder, gluten, and soy; eggs (either whole eggs, egg yolks or egg whites); an oxidant such as ascorbic acid, potassium bromate, potassium iodate, azodicarbonamide (ADA) or ammonium persulfate; an amino acid such as L-cysteine; a sugar; a salt such as sodium chloride, calcium acetate, sodium sulfate or calcium sulfate.

The dough may comprise fat (triglyceride) such as granulated fat or shortening, but the invention is equally applicable to a dough which is made without addition of fat.

The dough may further comprise an emulsifier such as mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, or lysolecithin.

In a preferred embodiment, the dough comprises wheat flour; preferably 10% (w/w) or more of the total flour content is wheat flour, preferably at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or preferably at least 95% (w/w) of the flour is wheat flour.

In a preferred embodiment, the dough comprises whole wheat flour; preferably 10% (w/w) or more of the total flour content is whole wheat flour, preferably at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or preferably at least 95% (w/w) of the flour is whole wheat flour.

The dough may be prepared applying any conventional mixing process, such as the continuous mix process, straight-dough process, or the sponge and dough method. The dough may be fresh, frozen or par-baked. The dough may be a laminated dough.

Baked Product

The process of the invention may be used for producing any kind of baked product prepared from dough, either of a soft or a crisp character, either of a white, light or dark type. The term baked product is understood to include any dough based products which are baked, steamed or fried.

Non-limiting examples of baked products include bread (in particular white, whole-meal or rye bread), typically in the form of loaves or rolls, French baguette-type bread, bagels, pita bread, tortillas, cakes, pancakes, biscuits, cookies, pie crusts, doughnuts, steamed bread, pizza and the like.

Composition for Preparing a Baked Product

The composition for preparing a baked product includes at least one peptidase of a type and in a sufficient amount to achieve a springiness of at least 0.5%, at least 1%, at least 2% or even at least 3% greater compared to a control baked product, at least one anti-staling amylase and optionally an additional enzyme as described below. The controlled baked product is prepared from the same dough composition but in the absence of the combination of anti-staling amylase and peptidase. The springiness remains over a 4-21 day shelf-life and preferably over a 14-21 day shelf-life.

The composition for preparing a baked product may be an enzyme preparation, e.g., in the form of a granulate or agglomerated powder. It may have a narrow particle size distribution with about 95% or more (by weight) of the particles in the range from 25 to 500 micrometer. Granulates and agglomerated powders may be prepared by conventional methods, e.g., by spraying the amylase and/or peptidase onto a carrier in a fluid-bed granulator. The carrier may have particulate cores having a suitable particle size. The carrier may be soluble or insoluble, e.g., a salt (such as NaCl or sodium sulfate), a sugar (such as sucrose or lactose), a sugar alcohol (such as sorbitol), starch, rice, corn grits, or soy.

The baking composition may, in addition to enzymes, comprise other baking ingredients, particularly flour. Thus, the composition may be a dough or a flour pre-mix.

Additional Enzymes

Optionally, one or more additional enzymes may be used in addition to the combination of at least one peptidase and at least one anti-staling amylase. These additional enzymes include, but are not limited to, a cyclodextrin glucanotransferase, a transglutaminase, a lipase, a phospholipase, a cellulase, a hemicelluase, a glycosyltransferase, a branching enzyme (1,4-alpha-glucan branching enzyme), an oxidase, or a phosphodiesterase. Combinations of these additional enzymes may be included.

The additional enzyme may be of any origin, including mammalian and plant, and preferably of microbial (bacterial, yeast or fungal) origin.

The hemicellulase may be a pentosanase, e.g., a xylanase which may be of microbial origin, e.g., derived from a bacterium or fungus, such as a strain of *Aspergillus*, in particular of *A. aculeatus, A. niger, A. awamori*, or *A. tubigensis*, from a strain of *Trichoderma*, e.g., *T. reesei*, or from a strain of *Humicola*, e.g., *H. insolens*.

The lipase may be derived from a strain of *Thermomyces* (*Humicola*), *Rhizomucor, Candida, Aspergillus, Rhizopus*, or *Pseudomonas*, in particular from *T. lanuginosus* (*H. lanuginosa*), *Rhizomucor miehei, C. antarctica, A niger, Rhizopus delemar, Rhizopus arrhizus* or *P. cepacia*.

The phospholipase may have phospholipase A1 or A2, phospholipase C, or lysophospholipase activity; it may or may not have lipase activity. It may be of animal origin, e.g., from pancreas, snake venom or bee venom, or it may be of microbial origin, e.g., from filamentous fungi, yeast or bacteria, such as *Aspergillus* or *Fusarium*, e.g., *A. niger, A. oryzae* or *F. oxysporum*. Also the variants described in WO 00/32578 may be used.

The oxidase may be a monosaccharide oxidase such as glucose oxidase (EC 1.1.3.4), hexose oxidase (EC 1.1.3.5), galactose oxidase (EC 1.1.3.9) or pyranose oxidase (ECb 1.1.3.10). It may also be a deaminating oxidase such as L-amino acid oxidase (EC 1.4.3.2) or amine oxidase (EC 1.4.3.4). Alternatively, the oxidase may be a peroxidase, a laccase or a lipoxygenase. The oxidase may have optimum activity at pH 4-5.5. The glucose oxidase may be derived from a strain of *Aspergillus* or *Penicillium*, particularly *A. niger, P. notatum, P. amagasakiense* or *P. vitale*. The hexose oxidase may be one described in EP 833563. The pyranose oxidase may be one described in WO 97/22257, e.g., derived from *Trametes*, particularly *T. hirsuta*. The galactose oxidase may be one described in WO 00/50606. The deaminating oxidase may be one described in WO 97/21351, e.g. a benzylamine oxidase derived from *Pichia*, particularly *P. pastoris*.

The phophodiesterase may be from a mammalian or microbial source, e.g., from yeast or filamentous fungi, such as *Aspergillus, Saccharomyces* or *Schizosaccharomyces*, particularly *A. oryzae, A. niger, Saccharomyces cerevisiae* or *Schizosaccharomyces pombe*.

Degree of Sequence Identity

For purposes of the present invention, the degree of sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:

(Identical Residues×100)/(Length of Alignment−
Total Number of Gaps in Alignment)

EXAMPLES

The present invention is further described by means of the examples, presented below. The use of such examples is illustrative only and in no way limits the scope and meaning of the invention or of any exemplified term. Likewise, the invention is not limited to any particular preferred embodiments described herein. Indeed, many modifications and variations of the invention will be apparent to those skilled in the art upon reading this specification. The invention is therefore to be limited only by the terms of the appended claims along with the full scope of equivalents to which the claims are entitled.

Bread Baked from Dough with Peptidase and/or Amylase

Dough was prepared from the basic ingredients listed in Table 1 as well as the additional enzymes detailed in Tables 2 to 4.

TABLE 1

| Ingredient | Wt % |
|---|---|
| Whole wheat flour* | 45.5 |
| Water | 52 |
| Sodium chloride | 2 |
| Baker's yeast | 2.5 |

*commercial wheat flour of moderate quality (treated with ascorbic acid): ~11% protein, ~15% humidity Dough was prepared from the ingredients detailed in Table 1, as well as the additional enzymatic components detailed in Table 2, and mixed with a spiral mixer for 4 minutes at 140 rpm and for 3 minutes at 280 rpm (Speed of the spiral rotor). The dough temperature was about 26° C. The dough was allowed to rise for 40 minutes at about 34° C. and high relative humidity, and, after degassing and molding, incubated for an additional 65 minutes at about 34° C. The dough was subsequently baked for 30 minutes at about 230° C. The dough and resulting baked bread was analyzed as detailed below.

Texture Analyzer Method

Firmness and springiness was measured using a TA-XT plus texture analyzer (Stable Micro Systems, Godalming, UK) using a probe shaped as a cylindrical plate having a 100 mm diameter (P/100, Stable Micro Systems, Godalming, UK). For each time point, firmness and springiness was preferably measured on 2 loafs of bread with 3 samples taken from each bread. Thus, for each time point, the firmness and springiness values were the average of the six measurements taken. Each sample was a cube of the bread crumb with the dimension of 45 mm×45 mm×45 mm taken from the center of the bread so that the crust and bread crumb closest to the crust was removed.

Measurements of firmness and springiness were conducted as follows. The sample cube of bread crumb was first compressed 20% using the cylindrical plate probe moving at a speed of 1 mm/s. The maximum force at 20% compression was taken as the firmness of the sample cube. After the first compression the probe was returned to the original height of the sample cube with a speed of 1 mm/s. Thereafter, the sample cube was subjected to 5 consecutive compressions of 70% of the sample cube height with a probe speed of 6.5 mm/s. The springiness was determined as the percentage of the height of the sample cube after the probe was removed from the sample cube (force was less than 5 g) following the last compression relative to the original height of the sample cube.

NMR Method

The mobility of free water, which can be correlated to the moist perception of the bread, was determined using a 24 MHz Maran Ultra Benchtop NMR (Resonance instruments, now Oxford instruments, Abingdon, UK) using a CPMG sequence. The analysis was run using the following settings, TAU=150 µs, Number of scans (NS)=4 Number of echoes (NECH)=512, Recycle Delay (RS)=3 s. The relaxation decay curve from each measurement was fitted using non-linear regression with 2 components and an off-set using the program WinFit (Resonance instruments, UK). As starting values for the fitting the following parameters were used, Tc1=1000 µs and Amp1=100; Tc2=10000 µs and Amp2=600; offset 20. The component with a relaxation time around 1500 µs was assigned bound water and the component with relaxation time around 7000-10000 µs was assigned free water.

Slicing Assay

The slicing properties associated with bread are especially important when sliced bread is prepared on an industrial scale. Notably, consumers expect a certain level of uniformity to the sliced bread product which may be compromised by bread sticking to the knife used for slicing the bread. In particular, the stickiness of the baked bread impacts slicing as a "moist" crumb may stick to the knife during slicing and thus interfere therewith. In brief, after about 2 hrs after baking, bread is sliced using an electric knife and/or a Daub slicing machine. Namely, a Daub slicing machine "compresses" the bread while it is processed by the slicing machine.

Example 1

Bread prepared from the ingredients detailed in Table 1 as well as the additional enzymatic components detailed in Table 2 below was qualitatively evaluated for texture as well as quantitatively evaluated at 14 and 21 days after baking using the Texture Analyzer and NMR methods. Notably, all Inventive Dough contained 1250 MANU/kg Novamyl along with a peptidase that differed for each Inventive Dough (i.e., EndoP2, EndoP4, or EndoP5) at a dosage of 0.25 mg/kg.

TABLE 2

| | Dough | | | | | |
|---|---|---|---|---|---|---|
| | C1 | C2 | C3 | I2 | I3 | I5 |
| EndoP2 (mg/kg) | — | — | — | — | 0.25 | — |
| EndoP4 (mg/kg) | — | — | — | 0.25 | — | — |
| EndoP5 (mg/kg) | — | — | — | — | — | 0.25 |
| Novamyl (MANU/kg) | — | 1250 | — | 1250 | 1250 | 1250 |
| Opticake (MANU/kg) | — | — | 333 | — | — | — |
| Fungamyl S (FAU/kg) | 59 | 59 | — | 59 | 59 | 59 |

Notes:
C = Control; I = Inventive
Units reflect the amount of enzyme added per kg of flour in total.

Bread prepared with the enzymes in Table 2 was evaluated for texture; the results of which are summarized below in Table 3. Ratings were assigned to each bread based on the degree of moisture present in the crumb. A rating of "1" or "2" may be considered unacceptable as regards the degree of dryness or moistness of the crumb. Conversely, a rating in the range of "3" to "5" may be considered acceptable as regards the degree of dryness or moistness of the crumb. Importantly, the addition of a peptidase to the dough in addition to an amylase allows a higher amount of anti-staling amylase to be added while still maintaining a favorable degree of moistness in the baked product produced there from.

TABLE 3

| Bread | Peptidase | Comments | Rating |
|---|---|---|---|
| C1 | Control | very dry | 1 |
| C2 | Benchmark Novamyl | very moist | 1 |
| C3 | Benchmark Opticake | unacceptably moist | 2 |
| I2 | EndoP4 | very good | 5 |
| I3 | EndoP2 | slightly dry | 3 |
| I5 | EndoP5 | very good | 5 |

As noted above, bread was also evaluated using a Texture Analyzer after 14 and 21 days. All bread prepared from inventive dough with Novamyl and peptidase was less firm than bread prepared from control dough having the same composition but without added Novamyl or peptidase (i.e., Control Dough "C1"). The firmness of bread prepared from inventive dough with Novamyl and peptidase was within a desirable range that was comparable to that of bread prepared from dough with Novamyl but no added peptidase (i.e., Benchmark Dough "C2"). Consequently, the firmness of bread prepared from inventive dough with Novamyl and peptidase is sufficiently low for the baked products to be regarded as not stale and/or "fresh" for at least 14 and even at least 21 days after baking.

Bread prepared from dough with Novamyl and either peptidase EndoP4, EndoP2, or EndoP5 was substantially springier than bread prepared from control dough with Novamyl but no added peptidase (i.e., Benchmark Dough "C2").

Thus, inclusion of Novamyl and either peptidase EndoP2, EndoP4, or EndoP5 in dough unexpectedly resulted in desirable levels of firmness as well as substantially improved springiness in bread produced there from. In addition, bread prepared from dough with Novamyl and peptidase EndoP4 retained a greater percentage of free water relative to bread prepared from dough with Novamyl and either peptidase EndoP2, or EndoP5.

Bread prepared from dough with an added anti-staling amylase in combination with at least one added peptidase was not only comparable or less firm initially (i.e., following storage for 4 days after baking) but also remained 50% less firm compared to bread prepared from control dough with no added anti-staling amylase or added peptidase following storage for 21 days after baking. Based on degree of the firmness of bread prepared from dough with an added anti-staling in combination with at least one added peptidase, such bread may be regarded as not stale and/or "fresh" for at least 21 days after baking. In addition to a superior softness over time, bread prepared from dough with at least one added anti-staling amylase and at least one added peptidase was also unexpectedly springy with an increase in springiness of at least 3% compared to bread prepared from control dough with an added anti-staling amylase but no added peptidase over the course of time examined (i.e., following storage for 4 to 21 days after baking).

Bread prepared from dough with at least one added anti-staling amylase in combination with at least one added peptidase was not only soft and springy, but also moist following storage for at least 21 days after baking. Bread prepared from dough with an anti-staling amylase in combination with a peptidase had at least a 3% increase and more preferably at least a 10% increase in initial free water mobility compared to bread prepared from dough with no added anti-staling amylase or peptidase. Furthermore, following storage for 21 days after baking, the free water mobility of bread prepared from dough with an anti-staling amylase in combination with a peptidase was approximately 5% greater compared to bread prepared from dough with no added anti-staling amylase or peptidase.

Lastly, bread prepared in accordance with the present invention produced slices of high quality when using an electric knife. Furthermore, embodiments of the present invention also produced quality bread slices when using a slicing machine. Namely, bread prepared from dough with 0.25 mg/kg 1 mg/kg ExoP4 peptidase in combination with 100 ppm/kg Novamyl produced bread slices of good quality when using a slicing machine, while bread prepared from dough with 0.25 mg/kg EndoP3 peptidase in combination with 100 ppm/kg Novamyl produced bread slices of even higher quality when using a slicing machine.

The invention claimed is:

1. A process for preparing a baked product comprising:
   adding to either a flour that is used to form a dough or directly to a dough:
   at least one maltogenic alpha-amylase in an amount of 0.1-10,000 MANU per kg of flour; and
   at least one endopeptidase in an amount of about 0.01 mg/kg to about 10 mg/kg of flour, wherein the at least one endopeptidase is selected from the group consisting of an endopeptidase having at least 90% identity to SEQ ID NO: 9, an endopeptidase haying at least 90% identity to SEQ ID NO: 15, and combinations thereof; and
   baking the dough to form the baked product, and wherein the added endopeptidase maintains springiness of the baked product for a period of at least 4-21 days after baking.

2. The process of claim 1, wherein the added endopeptidase and the added maltogenic alpha-amylase is comprised in a premix composition.

3. The process of claim 1, wherein the at least one endopeptidase is selected from the group consisting of an endopeptidase having at least 95% identity to SEQ ID NO: 9, an endopeptidase having at least 90% identity to SEQ ID NO: 15, and combinations thereof.

4. The process of claim 1, wherein the at least one maltogenic alpha-amylase is added in an amount of 1-5000 MANU per kg of flour.

5. The process of claim 1, wherein the at least one maltogenic alpha-amylase is added in an amount of 5-2000 MANU per kg of flour.

6. The process of claim 1, wherein the at least one maltogenic alpha-amylase is added in an amount of 10-1000 MANU per kg of flour.

* * * * *

SEQUENCE LISTING

<160> NUMBER OF SEQ ID NOS: 15

<210> SEQ ID NO 1
<211> LENGTH: 496
<212> TYPE: PRT
<213> ORGANISM: Aspergillus oryzae

<400> SEQUENCE: 1

```
Met Arg Ser Leu Leu Trp Ala Ser Leu Leu Ser Gly Val Leu Ala Gly
1               5                   10                  15

Arg Ala Leu Val Ser Pro Asp Glu Phe Pro Glu Asp Ile Gln Leu Glu
            20                  25                  30

Asp Leu Leu Glu Gly Ser Gln Gln Leu Glu Asp Phe Ala Tyr Ala Tyr
        35                  40                  45

Pro Glu Arg Asn Arg Val Phe Gly Gly Lys Ala His Asp Asp Thr Val
    50                  55                  60

Asn Tyr Leu Tyr Glu Glu Leu Lys Lys Thr Gly Tyr Tyr Asp Val Tyr
65                  70                  75                  80

Lys Gln Pro Gln Val His Leu Trp Ser Asn Ala Asp Gln Thr Leu Lys
                85                  90                  95

Val Gly Asp Glu Glu Ile Glu Ala Lys Thr Met Thr Tyr Ser Pro Ser
            100                 105                 110

Val Glu Val Thr Ala Asp Val Ala Val Lys Asn Leu Gly Cys Ser
        115                 120                 125

Glu Ala Asp Tyr Pro Ser Asp Val Glu Gly Lys Val Ala Leu Ile Lys
    130                 135                 140

Arg Gly Glu Cys Pro Phe Gly Asp Lys Ser Val Leu Ala Ala Lys Ala
145                 150                 155                 160

Lys Ala Ala Ala Ser Ile Val Tyr Asn Asn Val Ala Gly Ser Met Ala
                165                 170                 175

Gly Thr Leu Gly Ala Ala Gln Ser Asp Lys Gly Pro Tyr Ser Ala Ile
            180                 185                 190

Val Gly Ile Ser Leu Glu Asp Gly Gln Lys Leu Ile Lys Leu Ala Glu
        195                 200                 205

Ala Gly Ser Val Ser Val Asp Leu Trp Val Asp Ser Lys Gln Glu Asn
    210                 215                 220

Arg Thr Thr Tyr Asn Val Val Ala Gln Thr Lys Gly Gly Asp Pro Asn
225                 230                 235                 240

Asn Val Val Ala Leu Gly Gly His Thr Asp Ser Val Glu Ala Gly Pro
                245                 250                 255

Gly Ile Asn Asp Asp Gly Ser Gly Ile Ile Ser Asn Leu Val Ile Ala
            260                 265                 270

Lys Ala Leu Thr Gln Tyr Ser Val Lys Asn Ala Val Arg Phe Leu Phe
        275                 280                 285

Trp Thr Ala Glu Glu Phe Gly Leu Leu Gly Ser Asn Tyr Tyr Val Ser
    290                 295                 300

His Leu Asn Ala Thr Glu Leu Asn Lys Ile Arg Leu Tyr Leu Asn Phe
305                 310                 315                 320

Asp Met Ile Ala Ser Pro Asn Tyr Ala Leu Met Ile Tyr Asp Gly Asp
                325                 330                 335

Gly Ser Ala Phe Asn Gln Ser Gly Pro Ala Gly Ser Ala Gln Ile Glu
            340                 345                 350

Lys Leu Phe Glu Asp Tyr Tyr Asp Ser Ile Asp Leu Pro His Ile Pro
        355                 360                 365
```

```
Thr Gln Phe Asp Gly Arg Ser Asp Tyr Glu Ala Phe Ile Leu Asn Gly
    370                 375                 380

Ile Pro Ser Gly Gly Leu Phe Thr Gly Ala Glu Gly Ile Met Ser Glu
385                 390                 395                 400

Glu Asn Ala Ser Arg Trp Gly Gly Gln Ala Gly Val Ala Tyr Asp Ala
                405                 410                 415

Asn Tyr His Ala Ala Gly Asp Asn Met Thr Asn Leu Asn His Glu Ala
            420                 425                 430

Phe Leu Ile Asn Ser Lys Ala Thr Ala Phe Ala Val Ala Thr Tyr Ala
        435                 440                 445

Asn Asp Leu Ser Ser Ile Pro Lys Arg Asn Thr Thr Ser Ser Leu His
450                 455                 460

Arg Arg Ala Arg Thr Met Arg Pro Phe Gly Lys Arg Ala Pro Lys Thr
465                 470                 475                 480

His Ala His Val Ser Gly Ser Gly Cys Trp His Ser Gln Val Glu Ala
                485                 490                 495

<210> SEQ ID NO 2
<211> LENGTH: 555
<212> TYPE: PRT
<213> ORGANISM: Aspergillus oryzae

<400> SEQUENCE: 2

Met Arg Gly Tyr Glu Phe Leu Ser Val Leu Pro Leu Val Ala Ala Ser
1               5                   10                  15

Trp Ala Leu Pro Gly Ser Thr Pro Ala Ser Val Gly Arg Arg Gln Leu
            20                  25                  30

Pro Lys Asn Pro Thr Gly Val Lys Thr Leu Thr Thr Ala Asn Asn Val
        35                  40                  45

Thr Ile Arg Tyr Lys Glu Pro Gly Ala Glu Gly Val Cys Glu Thr Thr
    50                  55                  60

Pro Gly Val Lys Ser Tyr Ser Gly Tyr Val Asp Thr Ser Pro Glu Ser
65                  70                  75                  80

His Thr Phe Phe Trp Phe Phe Glu Ala Arg His Asn Pro Glu Thr Ala
                85                  90                  95

Pro Ile Thr Leu Trp Leu Asn Gly Gly Pro Gly Ser Asp Ser Leu Ile
            100                 105                 110

Gly Leu Phe Glu Glu Leu Gly Pro Cys His Val Asn Ser Thr Phe Asp
        115                 120                 125

Asp Tyr Ile Asn Pro His Ser Trp Asn Glu Val Ser Asn Leu Leu Phe
    130                 135                 140

Leu Ser Gln Pro Leu Gly Val Gly Phe Ser Tyr Ser Asp Thr Val Asp
145                 150                 155                 160

Gly Ser Ile Asn Pro Val Thr Gly Val Val Glu Asn Ser Ser Phe Ala
                165                 170                 175

Gly Val Gln Gly Arg Tyr Pro Thr Ile Asp Ala Thr Leu Ile Asp Thr
            180                 185                 190

Thr Asn Leu Ala Ala Glu Ala Ala Trp Glu Ile Leu Gln Gly Phe Leu
        195                 200                 205

Ser Gly Leu Pro Ser Leu Asp Ser Arg Val Gln Ser Lys Asp Phe Ser
    210                 215                 220

Leu Trp Thr Glu Ser Tyr Gly Gly His Tyr Gly Pro Ala Phe Phe Asn
225                 230                 235                 240

His Phe Tyr Glu Gln Asn Glu Arg Ile Ala Asn Gly Ser Val Asn Gly
                245                 250                 255
```

```
Val Gln Leu Asn Phe Asn Ser Leu Gly Ile Ile Asn Gly Ile Ile Asp
            260                 265                 270

Glu Ala Ile Gln Ala Pro Tyr Tyr Pro Glu Phe Ala Val Asn Asn Thr
            275                 280                 285

Tyr Gly Ile Lys Ala Val Asn Glu Thr Val Tyr Asn Tyr Met Lys Phe
            290                 295                 300

Ala Asn Gln Met Pro Asn Gly Cys Gln Asp Leu Ile Ser Thr Cys Lys
305                 310                 315                 320

Gln Thr Asn Arg Thr Ala Leu Ala Asp Tyr Ala Leu Cys Ala Glu Ala
                325                 330                 335

Thr Asn Met Cys Arg Asp Asn Val Glu Gly Pro Tyr Tyr Ala Phe Ala
            340                 345                 350

Gly Arg Gly Val Tyr Asp Ile Arg His Pro Tyr Asp Asp Pro Thr Pro
            355                 360                 365

Pro Ser Tyr Tyr Asn Lys Phe Leu Ala Lys Asp Ser Val Met Asp Ala
            370                 375                 380

Ile Gly Val Asn Ile Asn Tyr Thr Gln Ser Asn Asn Asp Val Tyr Tyr
385                 390                 395                 400

Ala Phe Gln Gln Thr Gly Asp Phe Val Trp Pro Asn Phe Ile Glu Asp
                405                 410                 415

Leu Glu Glu Ile Leu Ala Leu Pro Val Arg Val Ser Leu Ile Tyr Gly
            420                 425                 430

Asp Ala Asp Tyr Ile Cys Asn Trp Phe Gly Gly Gln Ala Val Ser Leu
            435                 440                 445

Ala Ala Asn Tyr Ser Gln Ala Ala Gln Phe Arg Ser Ala Gly Tyr Thr
            450                 455                 460

Pro Leu Lys Val Asn Gly Val Glu Tyr Gly Glu Thr Arg Glu Tyr Gly
465                 470                 475                 480

Asn Phe Ser Phe Thr Arg Val Tyr Glu Ala Gly His Glu Val Pro Tyr
                485                 490                 495

Tyr Gln Pro Ile Ala Ser Leu Gln Leu Phe Asn Arg Thr Ile Phe Gly
            500                 505                 510

Trp Asp Ile Ala Glu Gly Gln Lys Lys Ile Trp Pro Ser Tyr Lys Thr
            515                 520                 525

Asn Gly Thr Ala Thr Ala Thr His Thr Gln Ser Ser Val Pro Leu Pro
            530                 535                 540

Thr Ala Thr Ser Met Ser Ser Val Gly Met Ala
545                 550                 555

<210> SEQ ID NO 3
<211> LENGTH: 355
<212> TYPE: PRT
<213> ORGANISM: Lactococcus lactis cremori

<400> SEQUENCE: 3

Met Glu Leu Phe Asp Lys Val Lys Ala Leu Thr Glu Ile Gln Ala Thr
1               5                   10                  15

Ser Gly Phe Glu Gly Pro Val Arg Asp Tyr Leu Lys Ala Arg Met Val
            20                  25                  30

Glu Leu Gly Tyr Gln Pro Glu Asp Gly Leu Gly Ile Phe Val
            35                  40                  45

Thr Lys Ala Ser Lys Val Glu Asn Ala Pro Arg Ile Met Val Ala Ala
        50                  55                  60

His Met Asp Glu Val Gly Phe Met Val Ser Ser Ile Lys Ala Asp Gly
```

```
            65                  70                  75                  80
        Thr Phe Arg Val Pro Leu Gly Gly Trp Asn Pro Leu Val Val Ser
                        85                  90                  95

Gly Gln Arg Phe Thr Leu Phe Thr Arg Thr Gly Lys Lys Ile Pro Val
                        100                 105                 110

Val Thr Gly Leu Pro Pro His Leu Leu Arg Gly Thr Gly Val Thr
                        115                 120                 125

Pro Gln Ile Pro Ala Ile Ser Asp Ile Ile Phe Asp Gly Ala Phe Glu
                        130                 135                 140

Asn Ala Ala Glu Ala Ala Glu Phe Gly Ile Ala Gln Gly Asp Leu Ile
        145                 150                 155                 160

Ile Pro Glu Thr Glu Thr Ile Leu Ser Ala Asn Gly Lys Asn Ile Ile
                        165                 170                 175

Ser Lys Ala Trp Asp Asn Arg Tyr Gly Cys Leu Met Ile Leu Glu Leu
                        180                 185                 190

Leu Glu Phe Leu Ala Asp Lys Glu Leu Pro Val Thr Leu Ile Ile Gly
                        195                 200                 205

Ala Asn Val Gln Glu Glu Val Gly Leu Arg Gly Ala Lys Val Ser Thr
                        210                 215                 220

Thr Lys Phe Asn Pro Asp Leu Phe Ala Val Asp Cys Ser Pro Ala
        225                 230                 235                 240

Ser Asp Thr Phe Gly Asp Asp Asn Gly Arg Leu Gly Glu Gly Thr Thr
                        245                 250                 255

Leu Arg Phe Phe Asp Pro Gly His Ile Met Leu Pro Gly Met Lys Asn
                        260                 265                 270

Phe Leu Leu Asp Thr Ala Asn His Ala Lys Val Lys Thr Gln Val Tyr
                        275                 280                 285

Met Ala Lys Gly Gly Thr Asp Ala Gly Ala Ala His Leu Ala Asn Gly
                        290                 295                 300

Gly Val Pro Ser Thr Thr Ile Gly Val Val Ala Arg Tyr Ile His Ser
        305                 310                 315                 320

His Gln Thr Ile Phe Asn Ile Asp Asp Phe Leu Gln Ala Gln Thr Phe
                        325                 330                 335

Leu Arg Ala Ile Ile Thr Ser Leu Asn Thr Glu Lys Val Ala Glu Ile
                        340                 345                 350

Lys Asn Tyr
                355

<210> SEQ ID NO 4
<211> LENGTH: 449
<212> TYPE: PRT
<213> ORGANISM: Bacillus licheniformis

<400> SEQUENCE: 4

Met Lys Arg Lys Met Met Met Phe Gly Leu Ala Leu Ser Ile Ile Ala
1               5                   10                  15

Gly Gly Val Val Ala Asp Gly Thr Gly Asn Ala Ala Gln Ala Ala Pro
                20                  25                  30

Gln Glu Thr Ala Ile Ala Lys Asp Ile Glu Lys Phe Ser Lys Lys Phe
                35                  40                  45

Asn Glu Asn Arg Ala Tyr Gln Thr Ile Tyr His Leu Ser Glu Thr Ile
        50                  55                  60

Gly Pro Arg Val Thr Gly Thr Ala Glu Glu Lys Lys Ser Ala Ala Phe
65                  70                  75                  80
```

```
Ile Ala Ser Gln Met Lys Lys Ser Asn Leu Lys Val Ser Thr Gln Lys
                 85                  90                  95

Phe Ser Ile Pro Asp Arg Leu Glu Gly Thr Leu Thr Val Gln Gly Asn
            100                 105                 110

Asn Val Pro Ala Arg Pro Ala Gly Ser Ala Pro Thr Ala Ala Glu
            115                 120                 125

Gly Leu Ala Ala Pro Leu Tyr Asp Ala Gly Leu Gly Leu Pro Gly Asp
            130                 135                 140

Phe Thr Glu Glu Ala Lys Gly Lys Ile Ala Val Ile Leu Arg Gly Glu
145                 150                 155                 160

Leu Thr Phe Tyr Glu Lys Ala Lys Asn Ala Ala Asp Ala Gly Ala Ser
                165                 170                 175

Gly Val Ile Ile Tyr Asn Asn Val Asp Ser Leu Val Pro Leu Thr Pro
            180                 185                 190

Asn Leu Ser Gly Asn Lys Val Asp Ile Pro Val Val Gly Val Lys Lys
            195                 200                 205

Glu Asp Gly Glu Lys Leu Leu Ser Glu Gln Glu Ala Ile Leu Lys Leu
            210                 215                 220

Lys Ala His Lys Asn Gln Thr Ser Gln Asn Val Ile Gly Val Arg Lys
225                 230                 235                 240

Ala Lys Gly Val Lys Asn Pro Asp Ile Val Tyr Val Thr Ser His Tyr
                245                 250                 255

Asp Ser Val Pro Tyr Ala Pro Gly Ala Asn Asp Asn Ala Ser Gly Thr
            260                 265                 270

Ser Val Val Leu Glu Leu Ala Arg Ile Leu Lys Thr Val Pro Ala Asp
            275                 280                 285

Lys Glu Ile Arg Phe Ile Thr Phe Gly Ala Glu Glu Ile Gly Leu Leu
290                 295                 300

Gly Ser Arg His Tyr Val Ser Thr Leu Ser Asn Gln Glu Val Lys Arg
305                 310                 315                 320

Ser Val Ala Asn Phe Asn Leu Asp Met Val Ala Thr Ser Trp Glu Asn
                325                 330                 335

Ala Ser Gln Leu Tyr Ile Asn Thr Pro Asp Gly Ser Ala Asn Leu Val
            340                 345                 350

Trp Gln Leu Ser Lys Ala Ala Ser Leu Ser Leu Gly Lys Asp Val Leu
            355                 360                 365

Phe Leu His Gln Gly Gly Ser Ser Asp His Val Pro Phe His Glu Ala
            370                 375                 380

Gly Ile Asp Ser Ala Asn Phe Ile Trp Arg Glu Pro Gly Thr Gly Ala
385                 390                 395                 400

Leu Glu Pro Trp Tyr His Thr Pro Tyr Asp Thr Ile Glu His Ile Ser
                405                 410                 415

Lys Asp Arg Leu Lys Thr Ala Gly Gln Ile Ala Gly Thr Ala Val Tyr
            420                 425                 430

Asn Phe Thr Lys Lys Glu Asn Arg Lys Pro Ser Tyr Ser Ser Val Ala
            435                 440                 445

Gln
```

<210> SEQ ID NO 5
<211> LENGTH: 542
<212> TYPE: PRT
<213> ORGANISM: Aspergillus oryzae

<400> SEQUENCE: 5

```
Met Arg Val Leu Pro Ala Thr Leu Leu Val Gly Ala Ala Ser Ala Ala
 1               5                  10                  15

Val Pro Pro Leu Gln Gln Val Leu Gly Arg Pro Glu Glu Gly Met Ser
            20                  25                  30

Phe Ser Lys Pro Leu His Ala Phe Gln Glu Gln Leu Lys Thr Leu Ser
            35                  40                  45

Glu Asp Ala Arg Lys Leu Trp Asp Glu Val Ala Asn Tyr Phe Pro Asp
 50                  55                  60

Ser Met Asp His Ser Pro Ile Phe Ser Leu Lys Lys His Thr Arg
 65                  70                  75                  80

Arg Pro Asp Ser His Trp Asp His Ile Val Arg Gly Ser Asp Val Gln
                85                  90                  95

Lys Ile Trp Val Asn Asn Ala Asp Gly Glu Lys Glu Arg Glu Ile Asp
                100                 105                 110

Gly Lys Leu Glu Ala Tyr Asp Leu Arg Ile Lys Lys Ala Asp Pro Ser
            115                 120                 125

Ala Leu Gly Ile Asp Pro Asn Val Lys Gln Tyr Thr Gly Tyr Leu Asp
            130                 135                 140

Asp Asn Gly Asn Asp Lys His Leu Phe Tyr Trp Phe Phe Glu Ser Arg
145                 150                 155                 160

Asn Asp Pro Lys Asn Asp Pro Val Val Leu Trp Leu Asn Gly Gly Pro
                165                 170                 175

Gly Cys Ser Ser Leu Thr Gly Leu Phe Met Glu Leu Gly Pro Ser Ser
            180                 185                 190

Ile Asp Glu Asn Ile Lys Pro Val Tyr Asn Asp Phe Ser Trp Asn Ser
            195                 200                 205

Asn Ala Ser Val Ile Phe Leu Asp Gln Pro Val Asn Val Gly Tyr Ser
    210                 215                 220

Tyr Ser Gly Ser Ala Val Ser Asp Thr Val Ala Ala Gly Lys Asp Val
225                 230                 235                 240

Tyr Ala Leu Leu Ser Leu Phe Phe Lys Gln Phe Pro Glu Tyr Ala Glu
                245                 250                 255

Gln Asp Phe His Ile Ala Gly Glu Ser Tyr Ala Gly His Tyr Ile Pro
            260                 265                 270

Val Phe Ala Ser Glu Ile Leu Ala His Lys Asn Arg Asn Ile Asn Leu
            275                 280                 285

Lys Ser Val Leu Ile Gly Asn Gly Leu Thr Asp Gly Leu Thr Gln Tyr
            290                 295                 300

Gly Tyr Tyr Arg Pro Met Gly Cys Gly Glu Gly Gly Tyr Lys Ala Val
305                 310                 315                 320

Leu Asp Glu Ala Thr Cys Glu Ser Met Asp Asn Ala Leu Pro Arg Cys
            325                 330                 335

Arg Ser Met Ile Glu Ser Cys Tyr Asn Ser Glu Ser Ala Trp Val Cys
            340                 345                 350

Val Pro Ala Ser Ile Tyr Cys Asn Asn Ala Leu Ile Gly Pro Tyr Gln
            355                 360                 365

Arg Thr Gly Gln Asn Val Tyr Asp Val Arg Ser Lys Cys Glu Asp Glu
            370                 375                 380

Ser Asn Leu Cys Tyr Lys Gly Met Gly Tyr Val Ser Glu Tyr Leu Asn
385                 390                 395                 400

Lys Ala Glu Val Arg Glu Ala Val Gly Ala Glu Val Gly Gly Tyr Asp
                405                 410                 415

Ser Cys Asn Phe Asp Ile Asn Arg Asn Phe Leu Phe His Gly Asp Trp
```

-continued

```
                420                 425                 430
Met Lys Pro Tyr His Arg Leu Val Pro Gly Leu Leu Glu Gln Ile Pro
                435                 440                 445

Val Leu Ile Tyr Ala Gly Asp Ala Asp Tyr Ile Cys Asn Trp Leu Gly
            450                 455                 460

Asn Lys Ala Trp Thr Glu Ala Leu Glu Trp Pro Gly Gln Lys Glu Tyr
465                 470                 475                 480

Ala Ser Ala Glu Leu Glu Asp Leu Lys Ile Glu Gln Asn Glu His Thr
                485                 490                 495

Gly Lys Lys Ile Gly Gln Val Lys Ser His Gly Asn Phe Thr Phe Met
            500                 505                 510

Arg Leu Tyr Gly Gly Gly His Met Val Pro Met Asp Gln Pro Glu Ala
        515                 520                 525

Ser Leu Glu Phe Phe Asn Arg Trp Leu Gly Gly Glu Trp Phe
        530                 535                 540

<210> SEQ ID NO 6
<211> LENGTH: 771
<212> TYPE: PRT
<213> ORGANISM: Aspergillus oryzae

<400> SEQUENCE: 6

Met Lys Tyr Ser Lys Leu Leu Leu Leu Val Ser Val Val Gln Ala
1               5                   10                  15

Leu Asp Val Pro Arg Lys Pro His Ala Pro Thr Gly Glu Gly Ser Lys
                20                  25                  30

Arg Leu Thr Phe Asn Glu Thr Val Lys Gln Ala Ile Thr Pro Thr
            35                  40                  45

Ser Arg Ser Val Gln Trp Leu Ser Gly Ala Glu Asp Gly Ser Tyr Val
    50                  55                  60

Tyr Ala Ala Glu Asp Gly Ser Leu Thr Ile Glu Asn Ile Val Thr Asn
65                  70                  75                  80

Glu Ser Arg Thr Leu Ile Pro Ala Asp Lys Ile Pro Thr Gly Lys Glu
                85                  90                  95

Ala Phe Asn Tyr Trp Ile His Pro Asp Leu Ser Ser Val Leu Trp Ala
            100                 105                 110

Ser Asn His Thr Lys Gln Tyr Arg His Ser Phe Phe Ala Asp Tyr Tyr
        115                 120                 125

Val Gln Asp Val Glu Ser Leu Lys Ser Val Pro Leu Met Pro Asp Gln
    130                 135                 140

Glu Gly Asp Ile Gln Tyr Ala Gln Trp Ser Pro Val Gly Asn Thr Ile
145                 150                 155                 160

Ala Phe Val Arg Glu Asn Asp Leu Tyr Val Trp Asp Asn Gly Thr Val
                165                 170                 175

Thr Arg Ile Thr Asp Asp Gly Gly Pro Asp Met Phe His Gly Val Pro
            180                 185                 190

Asp Trp Ile Tyr Glu Glu Glu Ile Leu Gly Asp Arg Tyr Ala Leu Trp
        195                 200                 205

Phe Ser Pro Asp Gly Glu Tyr Leu Ala Tyr Leu Ser Phe Asn Glu Thr
    210                 215                 220

Gly Val Pro Thr Tyr Thr Val Gln Tyr Tyr Met Asp Asn Gln Glu Ile
225                 230                 235                 240

Ala Pro Ala Tyr Pro Trp Glu Leu Lys Ile Arg Tyr Pro Lys Val Ser
                245                 250                 255
```

```
Gln Thr Asn Pro Thr Val Thr Leu Ser Leu Asn Ile Ala Ser Lys
            260                 265                 270
Glu Val Lys Gln Ala Pro Ile Asp Ala Phe Glu Ser Thr Asp Leu Ile
        275                 280                 285
Ile Gly Glu Val Ala Trp Leu Thr Asp Thr His Thr Thr Val Ala Ala
    290                 295                 300
Lys Ala Phe Asn Arg Val Gln Asp Gln Gln Lys Val Val Ala Val Asp
305                 310                 315                 320
Thr Ala Ser Asn Lys Ala Thr Val Ile Ser Asp Arg Asp Gly Thr Asp
                325                 330                 335
Gly Trp Leu Asp Asn Leu Leu Ser Met Lys Tyr Ile Gly Pro Ile Lys
            340                 345                 350
Pro Ser Asp Lys Asp Ala Tyr Tyr Ile Asp Ile Ser Asp His Ser Gly
        355                 360                 365
Trp Ala His Leu Tyr Leu Phe Pro Val Ser Gly Gly Glu Pro Ile Pro
    370                 375                 380
Leu Thr Lys Gly Asp Trp Glu Val Thr Ser Ile Leu Ser Ile Asp Gln
385                 390                 395                 400
Glu Arg Gln Leu Val Tyr Tyr Leu Ser Thr Gln His His Ser Thr Glu
                405                 410                 415
Arg His Leu Tyr Ser Val Ser Tyr Ser Thr Phe Ala Val Thr Pro Leu
            420                 425                 430
Val Asp Asp Thr Val Ala Ala Tyr Trp Ser Ala Ser Phe Ser Ala Asn
        435                 440                 445
Ser Gly Tyr Tyr Ile Leu Thr Tyr Gly Gly Pro Asp Val Pro Tyr Gln
    450                 455                 460
Glu Leu Tyr Thr Thr Asn Ser Thr Lys Pro Leu Arg Thr Ile Thr Asp
465                 470                 475                 480
Asn Ala Lys Val Leu Glu Gln Ile Lys Asp Tyr Ala Leu Pro Asn Ile
                485                 490                 495
Thr Tyr Phe Glu Leu Pro Leu Pro Ser Gly Thr Leu Asn Val Met
            500                 505                 510
Gln Arg Leu Pro Pro Gly Phe Ser Pro Asp Lys Lys Tyr Pro Ile Leu
        515                 520                 525
Phe Thr Pro Tyr Gly Gly Pro Gly Ala Gln Glu Val Thr Lys Arg Trp
    530                 535                 540
Gln Ala Leu Asn Phe Lys Ala Tyr Val Ala Ser Asp Ser Glu Leu Glu
545                 550                 555                 560
Tyr Val Thr Trp Thr Val Asp Asn Arg Gly Thr Gly Phe Lys Gly Arg
                565                 570                 575
Lys Phe Arg Ser Ala Val Thr Arg Gln Leu Gly Leu Leu Glu Ala Glu
            580                 585                 590
Asp Gln Ile Tyr Ala Ala Gln Gln Ala Ala Asn Ile Pro Trp Ile Asp
        595                 600                 605
Ala Asp His Ile Gly Ile Trp Gly Trp Ser Phe Gly Gly Tyr Leu Thr
    610                 615                 620
Ser Lys Val Leu Glu Lys Asp Ser Gly Ala Phe Thr Leu Gly Val Ile
625                 630                 635                 640
Thr Ala Pro Val Ser Asp Trp Arg Phe Tyr Asp Ser Met Tyr Thr Glu
                645                 650                 655
Arg Tyr Met Lys Thr Leu Ser Thr Asn Glu Glu Gly Tyr Glu Thr Ser
            660                 665                 670
Ala Val Arg Lys Thr Asp Gly Phe Lys Asn Val Glu Gly Gly Phe Leu
```

```
            675                 680                 685
Ile Gln His Gly Thr Gly Asp Asp Asn Val His Phe Gln Asn Ser Ala
            690                 695                 700

Ala Leu Val Asp Leu Leu Met Gly Asp Gly Val Ser Pro Glu Lys Leu
705                 710                 715                 720

His Ser Gln Trp Phe Thr Asp Ser Asp His Gly Ile Ser Tyr His Gly
                725                 730                 735

Gly Gly Val Phe Leu Tyr Lys Gln Leu Ala Arg Lys Leu Tyr Gln Glu
                740                 745                 750

Lys Asn Arg Gln Thr Gln Val Leu Met His Gln Trp Thr Lys Lys Asp
                755                 760                 765

Leu Glu Glu
    770

<210> SEQ ID NO 7
<211> LENGTH: 355
<212> TYPE: PRT
<213> ORGANISM: Aspergillus oryzae

<400> SEQUENCE: 7

Met Arg Leu Val Ala Ser Leu Thr Ala Leu Val Ala Leu Ser Val Pro
1               5                   10                  15

Val Phe Pro Ala Ala Val Asn Val Lys Arg Ala Ser Ser Tyr Leu Glu
                20                  25                  30

Ile Thr Leu Ser Gln Val Ser Asn Thr Leu Ile Lys Ala Val Val Gln
            35                  40                  45

Asn Thr Gly Ser Asp Glu Leu Ser Phe Val His Leu Asn Phe Phe Lys
        50                  55                  60

Asp Pro Ala Pro Val Lys Lys Val Ser Val Tyr Arg Asp Gly Ser Glu
65                  70                  75                  80

Val Gln Phe Glu Gly Ile Leu Ser Arg Tyr Lys Ser Thr Gly Leu Ser
                85                  90                  95

Arg Asp Ala Phe Thr Tyr Leu Ala Pro Gly Glu Ser Val Glu Asp Val
            100                 105                 110

Phe Asp Ile Ala Ser Thr Tyr Asp Leu Thr Ser Gly Gly Pro Val Thr
        115                 120                 125

Ile Arg Thr Glu Gly Val Val Pro Tyr Ala Thr Ala Asn Ser Thr Asp
130                 135                 140

Ile Ala Gly Tyr Ile Ser Tyr Ser Ser Asn Val Leu Thr Ile Asp Val
145                 150                 155                 160

Asp Gly Ala Ala Ala Ala Thr Val Ser Lys Ala Ile Thr Pro Leu Asp
                165                 170                 175

Arg Arg Thr Arg Ile Ser Ser Cys Ser Gly Ser Arg Gln Ser Ala Leu
            180                 185                 190

Thr Thr Ala Leu Arg Asn Ala Ala Ser Leu Ala Asn Ala Ala Ala Asp
        195                 200                 205

Ala Ala Gln Ser Gly Ser Ala Ser Lys Phe Ser Glu Tyr Phe Lys Thr
    210                 215                 220

Thr Ser Ser Ser Thr Arg Gln Thr Val Ala Ala Arg Leu Arg Ala Val
225                 230                 235                 240

Ala Arg Glu Ala Ser Ser Ser Ser Gly Ala Thr Thr Tyr Cys
                245                 250                 255

Asp Asp Pro Tyr Gly Tyr Cys Ser Ser Asn Val Leu Ala Tyr Thr Leu
            260                 265                 270
```

```
Pro Ser Tyr Asn Ile Ile Ala Asn Cys Asp Ile Phe Thr Tyr Leu
            275                 280                 285

Pro Ala Leu Thr Ser Thr Cys His Ala Gln Asp Gln Ala Thr Thr Ala
    290                 295                 300

Leu His Glu Phe Thr His Ala Pro Gly Val Tyr Ser Pro Gly Thr Asp
305                 310                 315                 320

Asp Leu Ala Tyr Gly Tyr Gln Ala Ala Met Gly Leu Ser Ser Gln
            325                 330                 335

Ala Val Met Asn Ala Asp Thr Tyr Ala Leu Tyr Ala Asn Ala Ile Tyr
                340                 345                 350

Leu Gly Cys
        355

<210> SEQ ID NO 8
<211> LENGTH: 248
<212> TYPE: PRT
<213> ORGANISM: Fusarium oxysporum

<400> SEQUENCE: 8

Met Val Lys Phe Ala Ser Val Val Ala Leu Val Ala Pro Leu Ala Ala
1               5                   10                  15

Ala Ala Pro Gln Glu Ile Pro Asn Ile Val Gly Gly Thr Ser Ala Ser
                20                  25                  30

Ala Gly Asp Phe Pro Phe Ile Val Ser Ile Ser Arg Asn Gly Gly Pro
            35                  40                  45

Trp Cys Gly Gly Ser Leu Leu Asn Ala Asn Thr Val Leu Thr Ala Ala
    50                  55                  60

His Cys Val Ser Gly Tyr Ala Gln Ser Gly Phe Gln Ile Arg Ala Gly
65                  70                  75                  80

Ser Leu Ser Arg Thr Ser Gly Gly Ile Thr Ser Ser Leu Ser Ser Val
                85                  90                  95

Arg Val His Pro Ser Tyr Ser Gly Asn Asn Asn Asp Leu Ala Ile Leu
            100                 105                 110

Lys Leu Ser Thr Ser Ile Pro Ser Gly Gly Asn Ile Gly Tyr Ala Arg
        115                 120                 125

Leu Ala Ala Ser Gly Ser Asp Pro Val Ala Gly Ser Ser Ala Thr Val
    130                 135                 140

Ala Gly Trp Gly Ala Thr Ser Glu Gly Gly Ser Ser Thr Pro Val Asn
145                 150                 155                 160

Leu Leu Lys Val Thr Val Pro Ile Val Ser Arg Ala Thr Cys Arg Ala
                165                 170                 175

Gln Tyr Gly Thr Ser Ala Ile Thr Asn Gln Met Phe Cys Ala Gly Val
            180                 185                 190

Ser Ser Gly Gly Lys Asp Ser Cys Gln Gly Asp Ser Gly Gly Pro Ile
        195                 200                 205

Val Asp Ser Ser Asn Thr Leu Ile Gly Ala Val Ser Trp Gly Asn Gly
    210                 215                 220

Cys Ala Arg Pro Asn Tyr Ser Gly Val Tyr Ala Ser Val Gly Ala Leu
225                 230                 235                 240

Arg Ser Phe Ile Asp Thr Tyr Ala
                245

<210> SEQ ID NO 9
<211> LENGTH: 430
<212> TYPE: PRT
<213> ORGANISM: Rhizomucor miehei
```

<400> SEQUENCE: 9

Met Leu Phe Ser Gln Ile Thr Ser Ala Ile Leu Leu Thr Ala Ala Ser
1               5                   10                  15

Leu Ser Leu Thr Thr Ala Arg Pro Val Ser Lys Gln Ser Glu Ser Lys
            20                  25                  30

Asp Lys Leu Leu Ala Leu Pro Leu Thr Ser Val Ser Arg Lys Phe Ser
            35                  40                  45

Gln Thr Lys Phe Gly Gln Gln Leu Ala Glu Lys Leu Ala Gly Leu
    50                  55                  60

Lys Pro Phe Ser Glu Ala Ala Asp Gly Ser Val Asp Thr Pro Gly
65              70                  75                  80

Tyr Tyr Asp Phe Asp Leu Glu Glu Tyr Ala Ile Pro Val Ser Ile Gly
                85                  90                  95

Thr Pro Gly Gln Asp Phe Leu Leu Phe Asp Thr Gly Ser Ser Asp
            100                 105                 110

Thr Trp Val Pro His Lys Gly Cys Thr Lys Ser Glu Gly Cys Val Gly
            115                 120                 125

Ser Arg Phe Phe Asp Pro Ser Ala Ser Ser Thr Phe Lys Ala Thr Asn
    130                 135                 140

Tyr Asn Leu Asn Ile Thr Tyr Gly Thr Gly Gly Ala Asn Gly Leu Tyr
145                 150                 155                 160

Phe Glu Asp Ser Ile Ala Ile Gly Asp Ile Thr Val Thr Lys Gln Ile
                165                 170                 175

Leu Ala Tyr Val Asp Asn Val Arg Gly Pro Thr Ala Glu Gln Ser Pro
            180                 185                 190

Asn Ala Asp Ile Phe Leu Asp Gly Leu Phe Gly Ala Ala Tyr Pro Asp
    195                 200                 205

Asn Thr Ala Met Glu Ala Glu Tyr Gly Ser Thr Tyr Asn Thr Val His
    210                 215                 220

Val Asn Leu Tyr Lys Gln Gly Leu Ile Ser Ser Pro Leu Phe Ser Val
225                 230                 235                 240

Tyr Met Asn Thr Asn Ser Gly Thr Gly Glu Val Val Phe Gly Gly Val
                245                 250                 255

Asn Asn Thr Leu Leu Gly Gly Asp Ile Ala Tyr Thr Asp Val Met Ser
            260                 265                 270

Arg Tyr Gly Gly Tyr Tyr Phe Trp Asp Ala Pro Val Thr Gly Ile Thr
    275                 280                 285

Val Asp Gly Ser Ala Ala Val Arg Phe Ser Arg Pro Gln Ala Phe Thr
    290                 295                 300

Ile Asp Thr Gly Thr Asn Phe Phe Ile Met Pro Ser Ser Ala Ala Ser
305                 310                 315                 320

Lys Ile Val Lys Ala Ala Leu Pro Asp Ala Thr Glu Thr Gln Gln Gly
                325                 330                 335

Trp Val Val Pro Cys Ala Ser Tyr Gln Asn Ser Lys Ser Thr Ile Ser
            340                 345                 350

Ile Val Met Gln Lys Ser Gly Ser Ser Asp Thr Ile Glu Ile Ser
    355                 360                 365

Val Pro Val Ser Lys Met Leu Leu Pro Val Asp Gln Ser Asn Glu Thr
    370                 375                 380

Cys Met Phe Ile Ile Leu Pro Asp Gly Gly Asn Gln Tyr Ile Val Gly
385                 390                 395                 400

Asn Leu Phe Leu Arg Phe Phe Val Asn Val Tyr Asp Phe Gly Asn Asn

Arg Ile Gly Phe Ala Pro Leu Ala Ser Ala Tyr Glu Asn Glu
            420                 425                 430

<210> SEQ ID NO 10
<211> LENGTH: 231
<212> TYPE: PRT
<213> ORGANISM: Porcine

<400> SEQUENCE: 10

Phe Pro Thr Asp Asp Asp Lys Ile Val Gly Gly Tyr Thr Cys Ala
1               5                   10                  15

Ala Asn Ser Ile Pro Tyr Gln Val Ser Leu Asn Ser Gly Ser His Phe
            20                  25                  30

Cys Gly Gly Ser Leu Ile Asn Ser Gln Trp Val Val Ser Ala Ala His
            35                  40                  45

Cys Tyr Lys Ser Arg Ile Gln Val Arg Leu Gly Glu His Asn Ile Asp
50                  55                  60

Val Leu Glu Gly Asn Glu Gln Phe Ile Asn Ala Ala Lys Ile Ile Thr
65                  70                  75                  80

His Pro Asn Phe Asn Gly Asn Thr Leu Asp Asn Asp Ile Met Leu Ile
                85                  90                  95

Lys Leu Ser Ser Pro Ala Thr Leu Asn Ser Arg Val Ala Thr Val Ser
            100                 105                 110

Leu Pro Arg Ser Cys Ala Ala Ala Gly Thr Glu Cys Leu Ile Ser Gly
            115                 120                 125

Trp Gly Asn Thr Lys Ser Ser Gly Ser Ser Tyr Pro Ser Leu Leu Gln
            130                 135                 140

Cys Leu Lys Ala Pro Val Leu Ser Asp Ser Ser Cys Lys Ser Ser Tyr
145                 150                 155                 160

Pro Gly Gln Ile Thr Gly Asn Met Ile Cys Val Gly Phe Leu Glu Gly
                165                 170                 175

Gly Lys Asp Ser Cys Gln Gly Asp Ser Gly Gly Pro Val Val Cys Asn
            180                 185                 190

Gly Gln Leu Gln Gly Ile Val Ser Trp Gly Tyr Gly Cys Ala Gln Lys
            195                 200                 205

Asn Lys Pro Gly Val Tyr Thr Lys Val Cys Asn Tyr Val Asn Trp Ile
            210                 215                 220

Gln Gln Thr Ile Ala Ala Asn
225                 230

<210> SEQ ID NO 11
<211> LENGTH: 521
<212> TYPE: PRT
<213> ORGANISM: Bacillus amyloliquefaciens

<400> SEQUENCE: 11

Met Gly Leu Gly Lys Lys Leu Ser Val Ala Val Ala Ala Ser Phe Met
1               5                   10                  15

Ser Leu Thr Ile Ser Leu Pro Gly Val Gln Ala Ala Glu Asn Pro Gln
            20                  25                  30

Leu Lys Glu Asn Leu Thr Asn Phe Val Pro Lys His Ser Leu Val Gln
            35                  40                  45

Ser Glu Leu Pro Ser Val Ser Asp Lys Ala Ile Lys Gln Tyr Leu Lys
            50                  55                  60

Gln Asn Gly Lys Val Phe Lys Gly Asn Pro Ser Glu Arg Leu Lys Leu

-continued

```
            65                  70                  75                  80
Ile Asp Gln Thr Thr Asp Asp Leu Gly Tyr Lys His Phe Arg Tyr Val
                    85                  90                  95

Pro Val Val Asn Gly Val Pro Val Lys Asp Ser Gln Val Ile Ile His
                100                 105                 110

Val Asp Lys Ser Asn Asn Val Tyr Ala Ile Asn Gly Glu Leu Asn Asn
                115                 120                 125

Asp Val Ser Ala Lys Thr Ala Asn Ser Lys Lys Leu Ser Ala Asn Gln
130                 135                 140

Ala Leu Asp His Ala Tyr Lys Ala Ile Gly Lys Ser Pro Glu Ala Val
145                 150                 155                 160

Ser Asn Gly Thr Val Ala Asn Lys Asn Lys Ala Glu Leu Lys Ala Ala
                165                 170                 175

Ala Thr Lys Asp Gly Lys Tyr Arg Leu Ala Tyr Asp Val Thr Ile Arg
                180                 185                 190

Tyr Ile Glu Pro Glu Pro Ala Asn Trp Glu Val Thr Val Asp Ala Glu
                195                 200                 205

Thr Gly Lys Ile Leu Lys Lys Gln Asn Lys Val Glu His Ala Ala Thr
                210                 215                 220

Thr Gly Thr Gly Thr Thr Leu Lys Gly Lys Thr Val Ser Leu Asn Ile
225                 230                 235                 240

Ser Ser Glu Ser Gly Lys Tyr Val Leu Arg Asp Leu Ser Lys Pro Thr
                245                 250                 255

Gly Thr Gln Ile Ile Thr Tyr Asp Leu Gln Asn Arg Glu Tyr Asn Leu
                260                 265                 270

Pro Gly Thr Leu Val Ser Ser Thr Asn Gln Phe Thr Thr Ser Ser
                275                 280                 285

Gln Arg Ala Ala Val Asp Ala His Tyr Asn Leu Gly Lys Val Tyr Asp
                290                 295                 300

Tyr Phe Tyr Gln Lys Phe Asn Arg Asn Ser Tyr Asp Asn Lys Gly Gly
305                 310                 315                 320

Lys Ile Val Ser Val His Tyr Gly Ser Arg Tyr Asn Asn Ala Ala
                325                 330                 335

Trp Ile Gly Asp Gln Met Ile Tyr Gly Asp Gly Asp Gly Ser Phe Phe
                340                 345                 350

Ser Pro Leu Ser Gly Ser Met Asp Val Thr Ala His Glu Met Thr His
                355                 360                 365

Gly Val Thr Gln Glu Thr Ala Asn Leu Asn Tyr Glu Asn Gln Pro Gly
                370                 375                 380

Ala Leu Asn Glu Ser Phe Ser Asp Val Phe Gly Tyr Phe Asn Asp Thr
385                 390                 395                 400

Glu Asp Trp Asp Ile Gly Glu Asp Ile Thr Val Ser Gln Pro Ala Leu
                405                 410                 415

Arg Ser Leu Ser Asn Pro Thr Lys Tyr Gly Gln Pro Asp Asn Phe Lys
                420                 425                 430

Asn Tyr Lys Asn Leu Pro Asn Thr Asp Ala Gly Asp Tyr Gly Gly Val
                435                 440                 445

His Thr Asn Ser Gly Ile Pro Asn Lys Ala Ala Tyr Asn Thr Ile Thr
450                 455                 460

Lys Ile Gly Val Asn Lys Ala Glu Gln Ile Tyr Tyr Arg Ala Leu Thr
465                 470                 475                 480

Val Tyr Leu Thr Pro Ser Ser Thr Phe Lys Asp Ala Lys Ala Ala Leu
                485                 490                 495
```

Ile Gln Ser Ala Arg Asp Leu Tyr Gly Ser Gln Asp Ala Ala Ser Val
                500                 505                 510

Glu Ala Ala Trp Asn Ala Val Gly Leu
            515                 520

<210> SEQ ID NO 12
<211> LENGTH: 389
<212> TYPE: PRT
<213> ORGANISM: Aspergillus oryzae

<400> SEQUENCE: 12

Ala Asp Tyr Gln Val Tyr Ala Trp Gly Ile Asn Asp Pro Thr Glu Gly
1               5                   10                  15

Pro Arg Thr Val Ile Ser Asp Pro Trp Asp Ser Ala Ser Ala Phe
            20                  25                  30

Thr Trp Ile Ser Asp Gly Glu Asn Asn Tyr Thr Thr Arg Gly Asn
        35                  40                  45

Asn Gly Ile Ala Gln Ser Asn Pro Thr Gly Gly Ser Gln Tyr Leu Lys
    50                  55                  60

Asn Tyr Arg Pro Asp Ser Pro Asp Leu Lys Phe Gln Tyr Pro Tyr Ser
65                  70                  75                  80

Leu Asn Ala Thr Pro Pro Glu Ser Tyr Ile Asp Ala Ser Ile Thr Gln
                85                  90                  95

Leu Phe Tyr Thr Ala Asn Thr Tyr His Asp Leu Leu Tyr Thr Leu Gly
            100                 105                 110

Phe Asn Glu Glu Ala Gly Asn Phe Gln Tyr Asp Asn Asn Gly Lys Gly
            115                 120                 125

Gly Ala Gly Asn Asp Tyr Val Ile Leu Asn Ala Gln Asp Gly Ser Gly
        130                 135                 140

Thr Asn Asn Ala Asn Phe Ala Thr Pro Pro Asp Gly Gln Pro Gly Arg
145                 150                 155                 160

Met Arg Met Tyr Ile Trp Thr Glu Ser Gln Pro Tyr Arg Asp Gly Ser
                165                 170                 175

Phe Glu Ala Gly Ile Val Ile His Glu Tyr Thr His Gly Leu Ser Asn
            180                 185                 190

Arg Leu Thr Gly Gly Pro Ala Asn Ser Arg Cys Leu Asn Ala Leu Glu
        195                 200                 205

Ser Gly Gly Met Gly Glu Gly Trp Gly Asp Phe Met Ala Thr Ala Ile
    210                 215                 220

Arg Leu Lys Ala Gly Asp Thr His Ser Thr Asp Tyr Thr Met Gly Glu
225                 230                 235                 240

Trp Ala Ala Asn Lys Lys Gly Gly Ile Arg Ala Tyr Pro Phe Ser Thr
                245                 250                 255

Ser Leu Glu Thr Asn Pro Leu Thr Tyr Thr Ser Leu Asn Glu Leu Asp
            260                 265                 270

Glu Val His Ala Ile Gly Ala Val Trp Ala Asn Val Leu Tyr Glu Leu
        275                 280                 285

Leu Trp Asn Leu Ile Asp Lys His Gly Lys Asn Asp Gly Pro Lys Pro
    290                 295                 300

Glu Phe Lys Asp Gly Val Pro Thr Asp Gly Lys Tyr Leu Ala Met Lys
305                 310                 315                 320

Leu Val Ile Asp Gly Ile Ala Leu Gln Pro Cys Asn Pro Asn Cys Val
                325                 330                 335

Gln Ala Arg Asp Ala Ile Leu Asp Ala Asp Lys Ala Leu Thr Asp Gly

```
                 340             345             350
Ala Asn Lys Cys Glu Ile Trp Lys Ala Phe Ala Lys Arg Gly Leu Gly
            355                 360                 365

Glu Gly Ala Glu Tyr His Ala Ser Arg Arg Val Gly Ser Asp Lys Val
            370                 375                 380

Pro Ser Asp Ala Cys
385

<210> SEQ ID NO 13
<211> LENGTH: 188
<212> TYPE: PRT
<213> ORGANISM: Nocardiopsis sp.

<400> SEQUENCE: 13

Ala Asp Ile Ile Gly Gly Leu Ala Tyr Thr Met Gly Gly Arg Cys Ser
1               5                   10                  15

Val Gly Phe Ala Ala Thr Asn Ala Ala Gly Gln Pro Gly Phe Val Thr
            20                  25                  30

Ala Gly His Cys Gly Arg Val Gly Thr Gln Val Thr Ile Gly Asn Gly
        35                  40                  45

Arg Gly Val Phe Glu Gln Ser Val Phe Pro Gly Asn Asp Ala Ala Phe
50                  55                  60

Val Arg Gly Thr Ser Asn Phe Thr Leu Thr Asn Leu Val Ser Arg Tyr
65                  70                  75                  80

Asn Thr Gly Gly Tyr Ala Thr Val Ala Gly His Asn Gln Ala Pro Ile
                85                  90                  95

Gly Ser Ser Val Cys Arg Ser Gly Ser Thr Thr Gly Trp His Cys Gly
            100                 105                 110

Thr Ile Gln Ala Arg Gly Gln Ser Val Ser Tyr Pro Glu Gly Thr Val
        115                 120                 125

Thr Asn Met Thr Arg Thr Thr Val Cys Ala Glu Pro Gly Asp Ser Gly
130                 135                 140

Gly Ser Tyr Ile Ser Gly Thr Gln Ala Gln Gly Val Thr Ser Gly Gly
145                 150                 155                 160

Ser Gly Asn Cys Arg Thr Gly Gly Thr Thr Phe Tyr Gln Glu Val Thr
                165                 170                 175

Pro Met Val Asn Ser Trp Gly Val Arg Leu Arg Thr
            180                 185

<210> SEQ ID NO 14
<211> LENGTH: 355
<212> TYPE: PRT
<213> ORGANISM: Thermoascus aurantiacus

<400> SEQUENCE: 14

Met Arg Leu Val Ala Ser Leu Thr Ala Leu Val Ala Leu Ser Val Pro
1               5                   10                  15

Val Phe Pro Ala Ala Val Asn Val Lys Arg Ala Ser Ser Tyr Leu Glu
            20                  25                  30

Ile Thr Leu Ser Gln Val Ser Asn Thr Leu Ile Lys Ala Val Val Gln
        35                  40                  45

Asn Thr Gly Ser Asp Glu Leu Ser Phe Val His Leu Asn Phe Phe Lys
    50                  55                  60

Asp Pro Ala Pro Val Lys Lys Val Ser Val Tyr Arg Asp Gly Ser Glu
65                  70                  75                  80

Val Gln Phe Glu Gly Ile Leu Ser Arg Tyr Lys Ser Thr Gly Leu Ser
```

```
            85              90              95

Arg Asp Ala Phe Thr Tyr Leu Ala Pro Gly Glu Ser Val Glu Asp Val
                100                 105                 110

Phe Asp Ile Ala Ser Thr Tyr Asp Leu Thr Ser Gly Pro Val Thr
                115                 120             125

Ile Arg Thr Glu Gly Val Val Pro Tyr Ala Thr Ala Asn Ser Thr Asp
                130                 135                 140

Ile Ala Gly Tyr Ile Ser Tyr Ser Ser Asn Val Leu Thr Ile Asp Val
145                 150                 155                 160

Asp Gly Ala Ala Ala Thr Val Ser Lys Ala Ile Thr Pro Leu Asp
                    165                 170                 175

Arg Arg Thr Arg Ile Ser Ser Cys Ser Gly Ser Arg Gln Ser Ala Leu
                180                 185                 190

Thr Thr Ala Leu Arg Asn Ala Ala Ser Leu Ala Asn Ala Ala Asp
                195                 200                 205

Ala Ala Gln Ser Gly Ser Ala Ser Lys Phe Ser Glu Tyr Phe Lys Thr
                210                 215                 220

Thr Ser Ser Ser Thr Arg Gln Thr Val Ala Ala Arg Leu Arg Ala Val
225                 230                 235                 240

Ala Arg Glu Ala Ser Ser Ser Ser Gly Ala Thr Thr Tyr Tyr Cys
                    245                 250                 255

Asp Asp Pro Tyr Gly Tyr Cys Ser Ser Asn Val Leu Ala Tyr Thr Leu
                260                 265                 270

Pro Ser Tyr Asn Ile Ile Ala Asn Cys Asp Ile Phe Tyr Thr Tyr Leu
                275                 280                 285

Pro Ala Leu Thr Ser Thr Cys His Ala Gln Asp Gln Ala Thr Thr Ala
                290                 295                 300

Leu His Glu Phe Thr His Ala Pro Gly Val Tyr Ser Pro Gly Thr Asp
305                 310                 315                 320

Asp Leu Ala Tyr Gly Tyr Gln Ala Ala Met Gly Leu Ser Ser Ser Gln
                    325                 330                 335

Ala Val Met Asn Ala Asp Thr Tyr Ala Leu Tyr Ala Asn Ala Ile Tyr
                340                 345                 350

Leu Gly Cys
        355

<210> SEQ ID NO 15
<211> LENGTH: 272
<212> TYPE: PRT
<213> ORGANISM: Alicyclobacillus sp

<400> SEQUENCE: 15

Met Asn Gly Thr Ser Val Trp Lys Ala Ser Gly Ile Ala Ala Ser
1               5                   10                  15

Cys Leu Thr Ala Ala Ala Leu Leu Ala Trp Pro His Ala Thr Ser Thr
                20                  25                  30

Leu Asp Ala Ser Pro Ala Ile Phe His Ala Pro Arg His Ala Leu Ser
                35                  40                  45

Pro Asn Thr Ser Pro Lys Pro Asn Ser Val Gln Ala Gln Asn Phe Gly
                50                  55                  60

Trp Ser Ala Ser Asn Trp Ser Gly Tyr Ala Val Thr Gly Ser Thr Tyr
65                  70                  75                  80

Asn Asp Ile Thr Gly Ser Trp Ile Val Pro Ala Val Pro Ser Lys
                85                  90                  95
```

```
Arg Ser Thr Tyr Ser Ser Ser Trp Ile Gly Ile Asp Gly Phe Asn Asn
            100             105             110

Ser Asp Leu Ile Gln Thr Gly Thr Glu Gln Asp Tyr Val Asn Gly His
        115             120             125

Ala Gln Tyr Asp Ala Trp Trp Glu Ile Leu Pro Ala Pro Glu Thr Val
        130             135             140

Ile Ser Asn Met Thr Ile Ala Pro Gly Asp Arg Met Ser Ala His Ile
145             150             155             160

His Asn Asn Gly Asn Gly Thr Trp Thr Ile Thr Leu Thr Asp Val Thr
            165             170             175

Arg Asn Glu Thr Phe Ser Thr Thr Gln Ser Tyr Ser Gly Pro Gly Ser
        180             185             190

Ser Ala Glu Trp Ile Gln Glu Ala Pro Glu Ile Gly Gly Arg Ile Ala
        195             200             205

Thr Leu Ala Asn Tyr Gly Glu Thr Thr Phe Asp Pro Gly Thr Val Asn
        210             215             220

Gly Gly Asn Pro Gly Phe Thr Leu Ser Asp Ala Gly Tyr Met Val Gln
225             230             235             240

Asn Asn Ala Val Val Ser Val Pro Ser Ala Pro Asp Ser Asp Thr Asp
            245             250             255

Gly Phe Asn Val Ala Tyr Gly Ser Asn Gln Pro Ser Pro Pro Ala Ser
            260             265             270
```